(12) United States Patent
Ma et al.

(10) Patent No.: US 11,106,881 B2
(45) Date of Patent: Aug. 31, 2021

(54) PRINT RECOGNITION MODULE AND DISPLAY DEVICE

(71) Applicants: Chengdu BOE Optoelectronics Technology Co., Ltd., Chengdu (CN); BOE Technology Group Co., Ltd., Beijing (CN)

(72) Inventors: Xiao Ma, Beijing (CN); Bin Zhang, Beijing (CN); Chang Wang, Beijing (CN); Qianqian Liu, Beijing (CN)

(73) Assignees: Chengdu BOE Optoelectronics Technology Co., Ltd., Chengdu (CN); BOE Technology Group Co., Ltd., Beijing (CN)

( * ) Notice: Subject to any disclaimer, the term of this patent is extended or adjusted under 35 U.S.C. 154(b) by 0 days.

(21) Appl. No.: 16/982,023

(22) PCT Filed: Mar. 3, 2020

(86) PCT No.: PCT/CN2020/077655
§ 371 (c)(1),
(2) Date: Sep. 17, 2020

(87) PCT Pub. No.: WO2020/192368
PCT Pub. Date: Oct. 1, 2020

(65) Prior Publication Data
US 2021/0192174 A1 Jun. 24, 2021

(30) Foreign Application Priority Data
Mar. 27, 2019 (CN) .......................... 201910240244.X

(51) Int. Cl.
*G06K 9/00* (2006.01)
*G06F 3/041* (2006.01)

(52) U.S. Cl.
CPC ....... *G06K 9/00013* (2013.01); *G06F 3/0412* (2013.01)

(58) Field of Classification Search
None
See application file for complete search history.

(56) References Cited

U.S. PATENT DOCUMENTS

| 7,555,150 | B2 * | 6/2009 | Ikeda ................ G06K 9/00013 382/115 |
| 2017/0061109 | A1 * | 3/2017 | Takenouchi ....... G06K 9/00013 |
| 2017/0083739 | A1 * | 3/2017 | Chin ...................... G06F 3/044 |

FOREIGN PATENT DOCUMENTS

| CN | 105468153 A | 4/2016 |
| CN | 106547465 A | 3/2017 |

(Continued)

OTHER PUBLICATIONS

CN201910240244.X OA1.

*Primary Examiner* — Nicholas J Lee
(74) *Attorney, Agent, or Firm* — IPro, PLLC

(57) ABSTRACT

Disclosed are a print recognition module and a display device. The print recognition module includes a light guide structure including a light guide plate and an optical path adjusting component. The light guide plate includes a light incident surface and a light emergent surface arranged oppositely, and side surfaces connected between the light incident surface and the light emergent surface. A first optical sensor at a side of the light emergent surface, and a second optical sensor arranged corresponding to at least one of the side surfaces are provided. The optical path adjusting component is disposed between the side face and the second optical sensor, and includes a reflector. An included angle between the reflector and the light incident surface is an (Continued)

acute angle, and the reflector reflects at least part of light incident from the light incident side to the second optical sensor.

20 Claims, 3 Drawing Sheets

(56) References Cited

FOREIGN PATENT DOCUMENTS

| | | |
|---|---|---|
| CN | 107506757 A | 12/2017 |
| CN | 107608576 A | 1/2018 |
| CN | 108037985 A | 5/2018 |
| CN | 207558065 U | 6/2018 |
| CN | 208424471 U | 1/2019 |
| CN | 109919136 A | 6/2019 |
| DE | 4125198 C1 | 5/1992 |
| WO | 2017084003 A1 | 5/2017 |

* cited by examiner

PRINT RECOGNITION MODULE AND DISPLAY DEVICE

The present disclosure is a US National Stage of International Application No. PCT/CN2020/077655, filed on Mar. 3, 2020, which claims priority to Chinese Patent Publication No. 201910240244.X filed with the China National Intellectual Property Administration on Mar. 27, 2019 and entitled 'Print Recognition Module and Display Device', the entire contents of which are incorporated herein by reference.

FIELD

The present disclosure relates to the field of print recognition technology, in particular to a print recognition module and a display device.

BACKGROUND

Nowadays, people's demand for mobile phones increases, accordingly the requirements on mobile phones are getting higher and higher. A lot of personal photos, contact information, and private information are often stored in mobile phones. Therefore, people are paying more and more attention to the privacy and security measures of mobile phones. Unlocking methods of mobile phones are also required to be more and more precise, convenient and efficient. Among unlocking methods, comparing with using password and pattern, fingerprint is more popular.

SUMMARY

In an aspect, an embodiment of the present disclosure provides a print recognition module. The print recognition module includes: a light guide structure including a light guide plate and an optical path adjusting component. The light guide plate includes a light incident surface and a light emergent surface arranged oppositely, and side surfaces connected between the light incident surface and the light emergent surface. A first optical sensor at a side of the light emergent surface, and a second optical sensor arranged corresponding to at least one of the side surfaces are included. The optical path adjusting component is disposed between the side face and the second optical sensor, and includes a reflector. An included angle between the reflector and the light incident surface is an acute angle, and the reflector reflects at least part of light incident from the light incident side to the second optical sensor.

In some embodiments, an included angle between the side surface and the light incident surface is an acute angle; and the reflector is attached to the side surface.

In some embodiments, the optical path adjusting component is a triangular prism; and the triangular prism includes a first side surface, a second side surface and the reflector connected end to end successively, the first side surface and the second side surface being perpendicular to each other.

In some embodiments, the side surface and the light incident surface are perpendicular to each other; the optical path adjusting component is a triangular prism; and the triangular prism includes a first side surface, a second side surface and the reflector connected end to end successively. The first side surface and the second side surface are perpendicular to each other, the first side surface is attached to the side surface, and the second surface is flush with the light emergent surface.

In some embodiments, the side surface and the light incident surface are perpendicular to each other; the optical path adjusting component is a triangular prism. The triangular prism includes a first side surface, a second side surface and the reflector connected end to end successively. The first side surface and the second side surface are perpendicular to each other, the first side surface is parallel to the side surface, and the second surface is flush with the light incident surface.

In some embodiments, an included angle between the first side surface and the reflector is substantially equal to 45 degrees.

In some embodiments, in a direction perpendicular to the light incident surface, the thickness of the optical path adjusting component is substantially equal to that of the light guide plate.

In some embodiments, an orthographic projection of the optical path adjusting component on the light incident surface does not overlap an orthographic projection of the first optical sensor on the light incident surface.

In some embodiments, the print recognition module further includes a first brightness enhancing component between the second optical sensor and the light guide structure.

In some embodiments, the print recognition module further includes a second brightness enhancing component between the first optical sensor and the light guide structure.

In some embodiments, the first brightness enhancing component and the second brightness enhancing component are brightness enhancement films.

In some embodiments, the optical path adjusting component is arranged correspondingly at respective one of all side surfaces of the light guide plate.

In another aspect, an embodiment of the present disclosure further provides a display device, which includes a print recognition module and a display panel on a light incident side of the print recognition module. The print recognition module includes: a light guide structure including a light guide plate and an optical path adjusting component. The light guide plate includes a light incident surface and a light emergent surface arranged oppositely, and side surfaces connected between the light incident surface and the light emergent surface. A first optical sensor at a side of the light emergent surface, and a second optical sensor arranged corresponding to at least one of the side surfaces are included. The optical path adjusting component is disposed between the side face and the second optical sensor, and includes a reflector. An included angle between the reflector and the light incident surface is an acute angle, and the reflector reflects at least part of light incident from the light incident side to the second optical sensor.

BRIEF DESCRIPTION OF THE DRAWINGS

To describe technical solutions in the embodiments of the present disclosure more clearly, drawings used in description of the embodiments will be introduced briefly below. Obviously, the drawings described below merely represent some embodiments of the present disclosure, and those of ordinary skill in the art can obtain other drawings according to these drawings without inventive work.

DETAILED DESCRIPTION OF THE EMBODIMENTS

Figure 1:
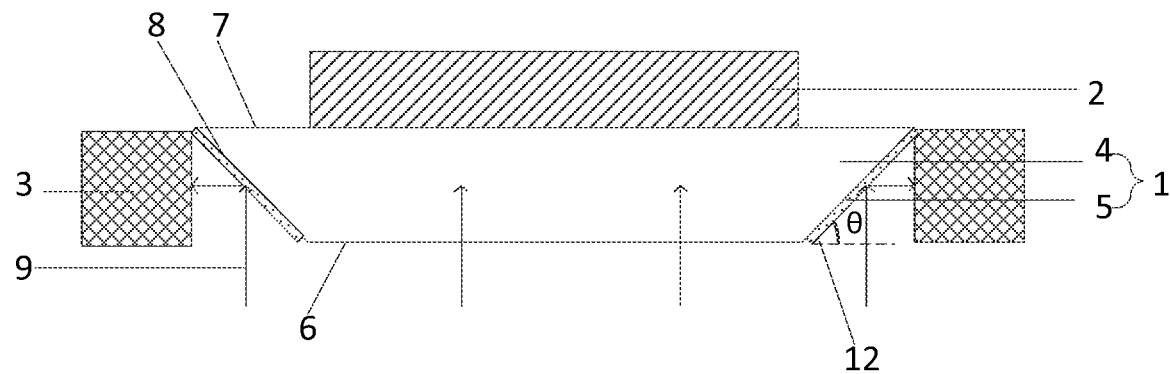
FIG. 1 is a structural diagram of a print recognition module provided by an embodiment of the present disclosure.

In fingerprint unlocking, optical fingerprint recognition is adopted by most mobile phones. An optical fingerprint module used for optical fingerprint recognition in related technologies always includes a collimator. However, the collimator is a device that only accepts perpendicularly incident light. That is to say, the optical fingerprint module can only perform recognition triggered by a finger perpendicular to the fingerprint module, but cannot recognize the fingerprint when a finger touches a side of the fingerprint module. In view of the above, the optical fingerprint recognition in related technologies cannot realize fingerprint recognition on a finger touching a side of a screen.

Based on the above-mentioned problem of the optical fingerprint recognition module in the related technologies, embodiments of the present disclosure provide a print recognition module and a display device. To make the objective, technical solutions and advantages of the present disclosure clearer, specific implementations of the print recognition module and the display device provided by the embodiments of the present disclosure will be described in detail below in conjunction with the accompanying drawings. It should be understood that the preferred embodiments described below are only used for describing and explaining the present disclosure, instead of limiting the present disclosure. Moreover, the embodiments in the present application and the features in the embodiments may be combined with each other without conflicts.

Unless otherwise defined, technical words or scientific terms used in the present disclosure shall have ordinary meanings understood by those of ordinary skill in the art to which the present disclosure pertains. The words "first", "second" and the like used in present disclosure Moreover, the do not indicate any order, quantity or importance, but are only used to distinguish different components. Words such as "comprise" or "include" indicate that an element or item appearing before such a word covers listed elements or items appearing after the word and equivalents thereof, and does not exclude other elements or items. Words such as "connect" or "interconnect" are not limited to physical or mechanical connections, but may include electrical connections, regardless of direct or indirect connection. Words such as "up", "down", "left" or "right" are only used to indicate a relative positional relationship. When the absolute position of a described object changes, the relative positional relationship may also change accordingly.

In addition, the shapes and sizes of the components in the drawings do not reflect the true scale, and are merely intended to schematically illustrate the present disclosure.

An embodiment of the present disclosure provides a print recognition module. As shown in FIG. 1, the print recognition module includes:
- a light guide structure 1, which includes a light guide plate 4 and an optical path adjusting component 5, where the light guide plate 4 includes a light incident surface 6 and a light emergent surface 7 which are arranged oppositely, and side surfaces 8 connected between the light incident surface 6 and the light emergent surface 7;
- a first optical sensor 2, on a side of the light emergent surface 7 of the light guide plate; and
- at least one second optical sensor 3, where respective one of the at least one second optical sensor 3 is arranged corresponding to respective one of at least one of the side surfaces of the light guide plate;
- where the optical path adjusting component 5 is disposed between the side face 8 and the second optical sensor 3, and the optical path adjusting component 5 includes a reflector 12. An included angle between the reflector 12 and the light incident surface 6 of the light guide plate is an acute angle, and the reflector 12 reflects at least part of light 9 incident from a light incident side of the light guide plate to the second optical sensor 3.

In some embodiments, the first optical sensor is provided on the light emergent surface of the light guide plate. As such the first optical sensor may receive optical information, and print recognition may be performed on a touch on a front surface of the print recognition module, i.e. on a plane where the print recognition module is located. The second optical sensor is provided on the side surface of the light guide plate, and at least part of the light incident from the light incident side of the light guide plate is reflected by the optical path adjusting component to the second optical sensor, so that the second optical sensor may receive optical information, and print recognition may be performed on a print resulting from a touch on the side surface of the print recognition module. In some embodiments, print recognition may be performed on a print resulting from a touch on whichever of the front surface and the side surface of the print recognition module, thereby expanding the range of print recognition of the print recognition module.

In some embodiments, as shown in FIG. 1, an included angle θ between the side surface 8 and the light incident surface 6 is an acute angle; and the reflector 12 is attached to the side surface 8.

In some embodiments, as the included angle between the side surface and the light incident surface is an acute angle, reflection of the incident light to the second optical sensor can be achieved by directly attaching the reflector to the side surface. In the case where the included angle between the side surface and the light incident surface is an acute angle, the optical path adjusting component may be a reflective film, which is directly attached to the side surface.

Figure 2:
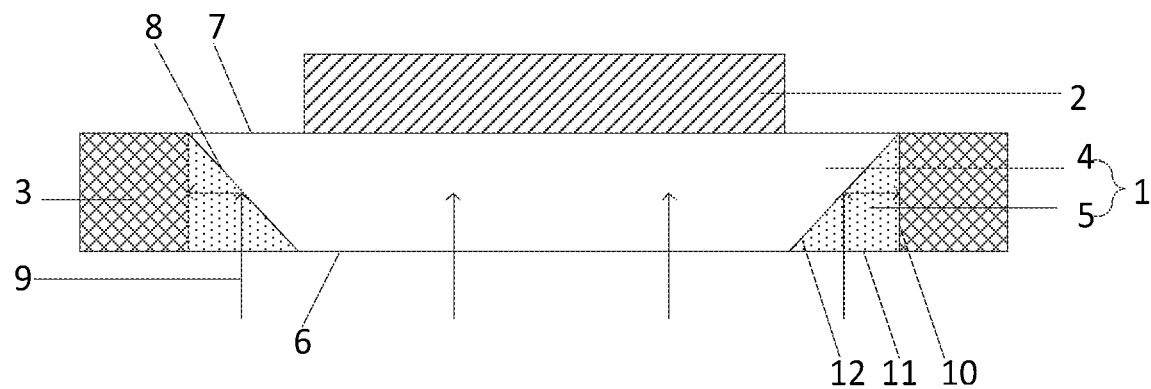
FIG. 2 is a structural diagram of another print recognition module provided by an embodiment of the present disclosure.

In some embodiments, as shown in FIG. 2, the optical path adjusting component 5 is a triangular prism; and the triangular prism includes a first side surface 10, a second side surface 11 and the reflector 12 connected end to end successively, the first side surface 10 and the second side surface 11 being perpendicular to each other.

In the print recognition module as shown in FIG. 2 provided by the embodiment of the present disclosure, the reflector of the optical path adjusting component is attached to the side surface of the light guide plate, and an included angle between the side surface and the light emergent surface of the light guide plate is an acute angle, and an included angle between the reflector and the light emergent surface of the light guide plate is an acute angle, such that an included angle between the light incident from the light incident side of the light guide plate and the reflector of the optical path adjusting component is an acute angle, and thus at least part of the light incident from the light incident side of the light guide plate may be reflected to the second optical sensor, so that the second optical sensor may receive optical information, and print recognition may be performed on a print resulting from a touch on the side surface of the print recognition module, thereby expanding the range of print recognition of the print recognition module.

Figure 3A:
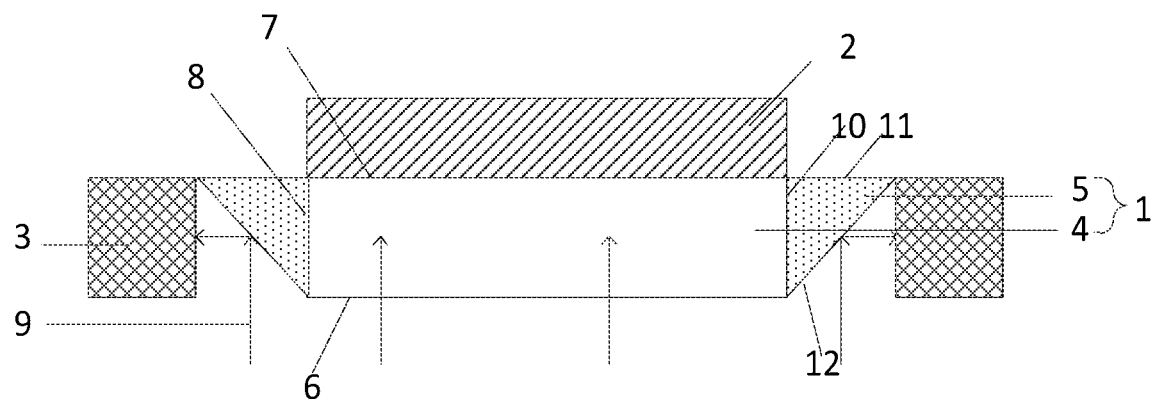
FIG. 3A is a first structural diagram of yet another print recognition module provided by an embodiment of the present disclosure.
Figure 3B:
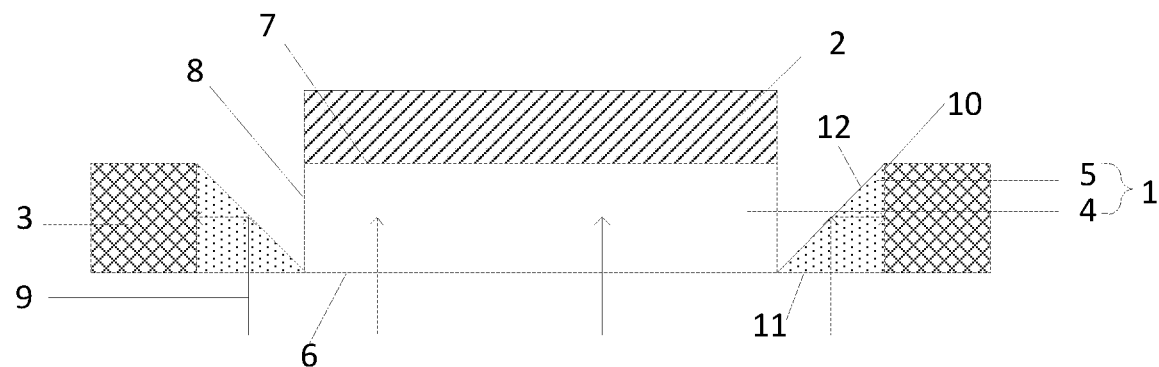
FIG. 3B is a second structural diagram of yet another print recognition module provided by an embodiment of the present disclosure.

In some embodiments, as shown in FIGS. 3A and 3B, the side surface 8 of the light guide plate 4 is perpendicular to the light incident surface 6. In the case where the optical path adjusting component 5 is a triangular prism, i.e. the triangular prism including the first side surface 10, the second side surface 11 and the reflector 12 connected end to end successively, there are two arrangement designs for the prism as follows:

as shown in FIG. 3A, the first side surface 10 is parallel to the side surface 8, and the second side surface 11 is flush with the light emergent surface 7, to ensure the included angle between the reflector 12 and the light incident surface 6 is an acute angle; and as shown in FIG. 3B, the first side surface 10 is parallel to the side surface 8, and the second side surface 11 is flush with the light incident surface 6, to ensure the included angle between the reflector 12 and the light incident surface 6 is an acute angle.

In some embodiments, in the print recognition module as shown in FIGS. 3A and 3B, the first side surface and the second side surface of the optical path adjusting component are perpendicular to each other, and the included angle between the reflector of the optical path adjusting component and the light emergent surface of the light guide plate is an acute angle, such that the included angle between the light incident from the light incident side of the light guide plate and the reflector of the optical path adjusting component is an acute angle, and thus at least part of the light incident from the light incident side of the light guide plate may be reflected to the second optical sensor, so that the second optical sensor may receive optical information, and print recognition may be performed on a print resulting from a touch on the side surface of the print recognition module, thereby expanding the range of print recognition of the print recognition module.

In some embodiments, the optical path adjusting component may also be in other shapes, so long as the optical path adjusting component can reflect the light incident from the light incident side of the light guide plate to the second optical sensor.

In some embodiments, the optical path adjusting component is a triangular prism.

In some embodiments, the reflector of the optical path adjusting structure may be made of a material with high light reflectivity, so that the intensity of the light reflected to the second optical sensor may be increased, and the sensitivity of print recognition is further improved.

In some embodiments, in the print recognition module as shown in FIGS. 2 and 3A, an included angle between the first side surface 10 and the reflector 12 may be substantially 45 degrees.

In some embodiments, in the print recognition module as shown in FIGS. 2 and 3A, as the included angle between the first side surface and the reflector is substantially 45 degrees, the included angle between the light incident from the light incident side of the light guide plate and the reflector of the optical path adjusting component is substantially 45 degrees, such that an included angle between the light incident from the light incident side of the light guide plate and the light reflected by the reflector of the optical path adjusting component is substantially 90 degrees, and thus after light incident perpendicular to the light incident surface of the light guide plate is reflected by the reflector, the light may be incident to the second optical sensor in a direction perpendicular to a plane where the second optical sensor is located, and the sensitivity of print recognition is further improved.

In some embodiments, in the print recognition module as shown in FIGS. 2 and 3A, in a direction perpendicular to the light incident surface 6, the thickness of the optical path adjusting component 5 is substantially equal to that of the light guide plate 4.

In some embodiments, the thickness of the light guide plate is 8 mm. Correspondingly, in a direction perpendicular to a plane where the light guide plate is located, the length of the first side surface of the optical path adjusting component is 8 mm. Setting the thicknesses to be substantially same can increase the flatness of the light incident surface and the light emergent surface during attachment, and is beneficial to increasing the binding force between the optical adjusting component and the light guide plate or the second optical sensor.

In some embodiments, in the print recognition module as shown in FIGS. 2 and 3A, an orthographic projection of the optical path adjusting component 5 on the light incident surface 6 does not overlap an orthographic projection of the first optical sensor 2 on the light incident surface 6.

In some embodiments, as the orthographic projection of the optical path adjusting component does not overlap the orthographic projection of the first optical sensor, the quantity of information that the first optical sensor needs to recognize and process may be reduced while print recognition is being performed on a print resulting from a touch on the side surface of the print recognition module. With the optimization of the range of optical information received by the first optical sensor, a light receiving surface of the first optical sensor may also be reduced, so that the volume of the first optical sensor may be reduced, and the space required for a sensor processor side may also be reduced. Thus, when the print recognition module provided by the embodiment of the present disclosure is applied to a specific product, the saved space may be used to expand the space for other parts. For example, it may be used for expanding the space for a memory, thereby increasing the internal storage; it may also be used for increasing the battery space, thereby increasing the battery capacity of the product. In addition, such design can avoid the problem of a poor heat dissipation effect caused by insufficient internal space.

Figure 4A:
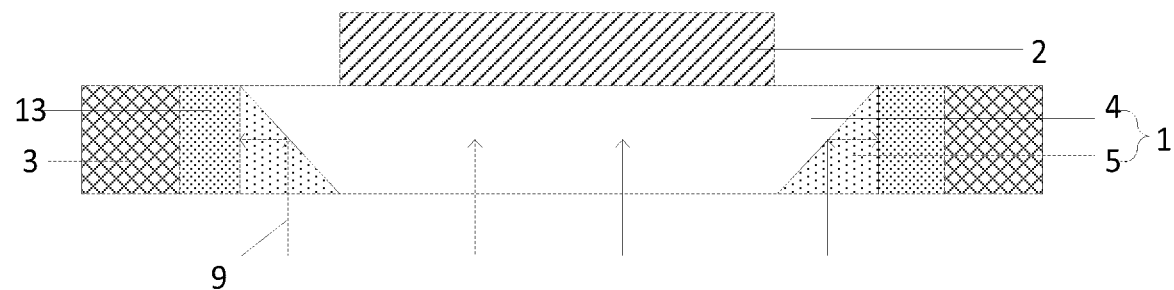
FIG. 4A is a first structural diagram of still yet another print recognition module provided by an embodiment of the present disclosure.

In some embodiments, the print recognition module provided by the embodiment of the present disclosure, as shown in FIG. 4A, further includes a first brightness enhancing component 13, between the second optical sensor 3 and the light guide structure 1.

Figure 4B:
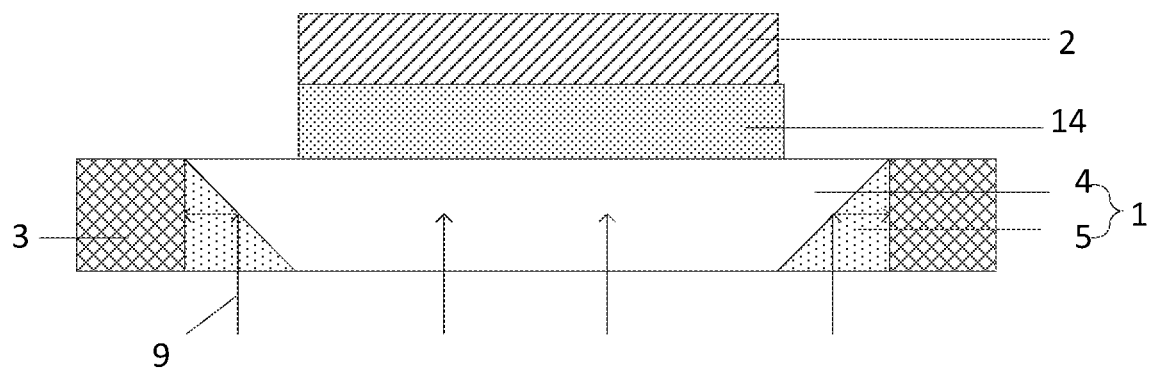
FIG. 4B is a second structural diagram of still yet another print recognition module provided by an embodiment of the present disclosure.

In some embodiments, the print recognition module provided by the embodiment of the present disclosure, as shown in FIG. 4B, further includes a second brightness enhancing component 14, between the first optical sensor 2 and the light guide structure 1.

In some embodiments, as the brightness enhancing component is provided between the sensor and the light guide structure, the light intensity may be increased after light emergent from the light guide structure passes through the brightness enhancing component, and the brightness of light arriving at the sensor is further improved, and thus the sensitivity of print recognition may be improved.

Figure 4C:
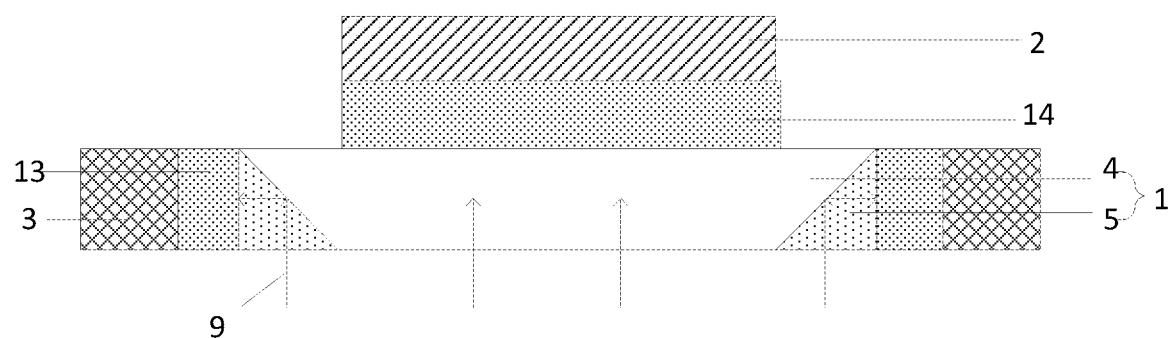
FIG. 4C is a third structural diagram of still yet another print recognition module provided by an embodiment of the present disclosure.

As shown in FIG. 4A, the print recognition module provided by the embodiment of the present disclosure includes a light guide structure 1, a first optical sensor 2, a second optical sensor 3 and a first brightness enhancing component 13 between the second optical sensor 3 and the light guide structure 1. In this way, the brightness of light arriving at the second sensor may be improved. As shown in FIG. 4B, a second brightness enhancing component 14 is disposed between the first optical sensor 2 and the light guide structure 1; and as shown in FIG. 4C, a first brightness enhancing component 13 is disposed between the second optical sensor 3 and the light guide structure 1, and a second brightness enhancing component 14 is disposed between the first optical sensor 2 and the light guide structure 1. The structure is not limited as such and may be designed based on actual needs.

In some embodiments, in the print recognition module including the brightness enhancing components, both the first brightness enhancing component and the second brightness enhancing component may be brightness enhancement film.

In some embodiments, optical path adjusting component is provided corresponding to respective one of all side surfaces of the light guide plate.

In some embodiments, by providing the optical path adjusting components corresponding to all of the side surfaces of the light guide plate, print recognition may be performed on a touch on any side surface of the print recognition module, and the range of print recognition may be further expanded.

An embodiment of the present disclosure provides a display device, which includes the print recognition module provided by an embodiment of the present disclosure, and a display panel on a light incident side of the print recognition module.

In the display device provided by the embodiment of the present disclosure, as the print recognition module provided by an embodiment of the present disclosure is included, print recognition may be performed on a print resulting from a touch on whichever of a front surface and a side surface of the display device, thereby expanding the range of print recognition of the display device, and improving user experience.

The display device provided by the embodiment of the present disclosure may be, for example, a mobile phone, a tablet computer or other device.

Figure 5:
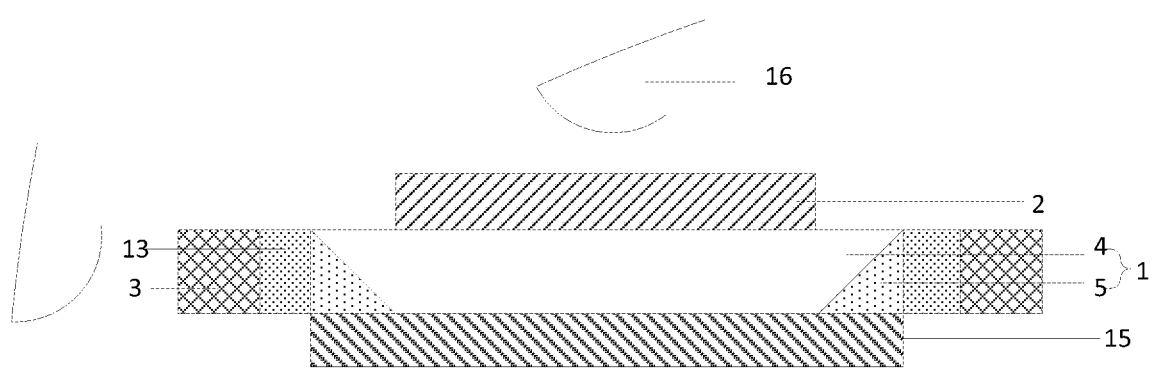
FIG. 5 is a structural diagram of a display device provided by an embodiment of the present disclosure.

As shown in FIG. 5, the display device provided by the embodiment of the present disclosure includes a display panel 15 and a print recognition module. The print recognition module includes a first optical sensor 2, a second optical sensor 3, a light guide plate 4, an optical path adjusting component 5 and a brightness enhancing component 13. The display panel is disposed on a light incident side of the print recognition module. i.e. the print recognition module is disposed on a light emergent side of the display panel. Light emergent from the display panel is used as a light source of print recognition. A print-generating touch occurs on a light emergent side of the print recognition module. The print-generating touch may be, for example, a touch of a finger 16. The finger 16 touches a front surface or a side surface of the display device, and the display device may recognize the fingerprint of the finger 16.

In some embodiments, the display panel is an electroluminescent display panel.

In some embodiments, the electroluminescent display panel may be, for example, an organic light-emitting diode (OLED) display panel.

In summary, in the print recognition module and the display device provided by embodiments of the present disclosure, the first optical sensor is provided on the light emergent surface of the light guide plate, so that the first optical module may receive optical information, and print recognition may be performed on a touch on a front surface of the print recognition module, i.e. on a plane where the print recognition module is located; and the second optical sensor is provided on the side surface of the light guide plate, and at least part of the light incident from the light incident side of the light guide plate is reflected by the optical path adjusting component to the second optical sensor, so that the second optical sensor may receive optical information, and print recognition may be performed on a print resulting from a touch on the side surface of the print recognition module. In some embodiments, print recognition may be performed on a print resulting from a touch on whichever of the front surface and the side surface of the print recognition module, thereby expanding the range of print recognition of the print recognition module.

Evidently, those skilled in the art can make various modifications and variations to the present disclosure without departing from the spirit and scope of the present disclosure. Thus, the present disclosure is also intended to encompass these modifications and variations thereto so long as the modifications and variations come into the scope of the claims appended to the present disclosure and their equivalents.

What is claimed is:

1. A print recognition module, comprising:
   a light guide structure;
      wherein the light guide structure comprises:
         a light guide plate; and
         an optical path adjusting component;
            wherein the light guide plate comprises a light incident surface and a light emergent surface arranged oppositely, and side surfaces connected between the light incident surface and the light emergent surface;
   a first optical sensor at a side of the light emergent surface of the light guide plate; and
   at least one second optical sensor; wherein respective one of the at least one second optical sensor corresponds to respective one of at least one of the side surfaces of the light guide plate; wherein
   the optical path adjusting component is disposed between the side face of the light guide plate and the second optical sensor, and comprises a reflector, wherein
      an included angle between the reflector and the light incident surface of the light guide plate is an acute angle; and
      the reflector reflects at least part of light incident from a light incident side of the light guide plate to the second optical sensor.

2. The print recognition module according to claim 1, wherein
   an included angle between the side surface and the light incident surface is an acute angle; and
   the reflector is attached to the side surface.

3. The print recognition module according to claim 2, wherein the optical path adjusting component is a triangular prism; and the triangular prism comprises:
a first side surface;
a second side surface; and
the reflector;
wherein
the first side surface, the second side surface and the reflector are connected end to end successively; and
the first side surface and the second side surface are perpendicular to each other.

4. The print recognition module according to claim 1, wherein
the side surface and the light incident surface are perpendicular to each other;
the optical path adjusting component is a triangular prism; and
the triangular prism comprises:
a first side surface;
a second side surface; and
the reflector;
wherein
the first side surface, the second side surface and the reflector are connected end to end successively;
the first side surface and the second side surface are perpendicular to each other;
the first side surface is attached to the side surface; and
the second surface is substantially flush with the light emergent surface.

5. The print recognition module according to claim 1, wherein
the side surface and the light incident surface are perpendicular to each other;
the optical path adjusting component is a triangular prism; and
a first side surface;
a second side surface; and
the reflector;
wherein
the first side surface, the second side surface and the reflector are connected end to end successively;
the first side surface and the second side surface are perpendicular to each other;
the first side surface is parallel to the side surface; and
the second surface is substantially flush with the light incident surface.

6. The print recognition module according to claim 3, wherein an included angle between the first side surface and the reflector is substantially equal to 45 degrees.

7. The print recognition module according to claim 3, wherein in a direction perpendicular to the light incident surface, a thickness of the optical path adjusting component is substantially equal to a thickness of the light guide plate.

8. The print recognition module according to claim 3, wherein an orthographic projection of the optical path adjusting component on the light incident surface does not overlap an orthographic projection of the first optical sensor on the light incident surface.

9. The print recognition module according to claim 1, further comprising:
a first brightness enhancing component between the second optical sensor and the light guide structure.

10. The print recognition module according to claim 1, further comprising:

a second brightness enhancing component between the first optical sensor and the light guide structure.

11. The print recognition module according to claim 9, wherein the first brightness enhancing component is a brightness enhancement film.

12. The print recognition module according to claim 1, wherein the optical path adjusting component is arranged correspondingly at respective one of all side surfaces of the light guide plate.

13. A display device, comprising:
a print recognition module; and
a display panel on a light incident side of the print recognition module;
wherein the print recognition module comprises:
a light guide structure;
wherein the light guide structure comprises:
a light guide plate; and
an optical path adjusting component;
wherein the light guide plate comprises a light incident surface and a light emergent surface arranged oppositely, and side surfaces connected between the light incident surface and the light emergent surface;
a first optical sensor at a side of the light emergent surface of the light guide plate; and
at least one second optical sensor corresponding to at least one of the side surfaces of the light guide plate; wherein
the optical path adjusting component is disposed between the side face of the light guide plate and the second optical sensor, and comprises a reflector, wherein
an included angle between the reflector and the light incident surface of the light guide plate is an acute angle; and
the reflector reflects at least part of light incident from a light incident side of the light guide plate to the second optical sensor.

14. The print recognition module according to claim 10, wherein the second brightness enhancing component is a brightness enhancement film.

15. The display device according to claim 13, wherein
an included angle between the side surface and the light incident surface is an acute angle; and
the reflector is attached to the side surface.

16. The display device according to claim 15, wherein
the optical path adjusting component is a triangular prism; and
the triangular prism comprises:
a first side surface;
a second side surface; and
the reflector;
wherein
the first side surface, the second side surface and the reflector are connected end to end successively; and
the first side surface and the second side surface are perpendicular to each other.

17. The display device according to claim 13, wherein
the side surface and the light incident surface are perpendicular to each other;
the optical path adjusting component is a triangular prism; and
the triangular prism comprises:
a first side surface;
a second side surface; and
the reflector;

wherein
the first side surface, the second side surface and the reflector are connected end to end successively;
the first side surface and the second side surface are perpendicular to each other;
the first side surface is attached to the side surface; and
the second surface is substantially flush with the light emergent surface.

18. The display device according to claim 13, wherein the side surface and the light incident surface are perpendicular to each other;
the optical path adjusting component is a triangular prism; and
a first side surface;
a second side surface; and
the reflector;
wherein
the first side surface, the second side surface and the reflector are connected end to end successively;
the first side surface and the second side surface are perpendicular to each other;
the first side surface is parallel to the side surface; and
the second surface is substantially flush with the light incident surface.

19. The display device according to claim 13, wherein the print recognition module further comprises:
a first brightness enhancing component between the second optical sensor and the light guide structure.

20. The display device according to claim 13, wherein the print recognition module further comprises:
a second brightness enhancing component between the first optical sensor and the light guide structure.

* * * * *